(12) United States Patent
Hasegawa et al.

(10) Patent No.: US 11,732,624 B2
(45) Date of Patent: Aug. 22, 2023

(54) FUEL PRODUCTION DEVICE

(71) Applicant: HITACHI, LTD., Tokyo (JP)

(72) Inventors: Hiroaki Hasegawa, Tokyo (JP); Yuzo Shirakawa, Tokyo (JP); Hiroto Naito, Tokyo (JP); Takao Ishikawa, Tokyo (JP)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 17/639,748

(22) PCT Filed: Mar. 26, 2020

(86) PCT No.: PCT/JP2020/013721
§ 371 (c)(1),
(2) Date: Mar. 2, 2022

(87) PCT Pub. No.: WO2021/192156
PCT Pub. Date: Sep. 30, 2021

(65) Prior Publication Data
US 2022/0333515 A1    Oct. 20, 2022

(51) Int. Cl.
*F01N 3/00* (2006.01)
*C10L 3/08* (2006.01)
(Continued)

(52) U.S. Cl.
CPC ............. *F01N 3/005* (2013.01); *C10L 3/08* (2013.01); *F01N 3/08* (2013.01); *F02M 25/12* (2013.01); *F02M 27/04* (2013.01); *F02M 31/20* (2013.01)

(58) Field of Classification Search
CPC ........ C10L 1/08; C10L 2290/567; C10L 3/08; C25B 1/02; F01N 3/005; F01N 3/08;
(Continued)

(56) References Cited

U.S. PATENT DOCUMENTS

2009/0000574 A1    1/2009  Sugimasa et al.
2015/0308002 A1*  10/2015  Onishi ............... C25B 9/23
                                                        204/242
(Continued)

FOREIGN PATENT DOCUMENTS

DE    102017210324    * 12/2018
JP    2006-206931 A     8/2006
(Continued)

OTHER PUBLICATIONS

International Search Report of PCT/JP2020/013721 dated Jun. 16, 2020.

*Primary Examiner* — Phutthiwat Wongwian
*Assistant Examiner* — Diem T Tran
(74) *Attorney, Agent, or Firm* — Mattingly & Malur, PC (57) ABSTRACT

Provided is a device that uses a high-temperature exhaust gas released from an internal combustion engine to produce a fuel. The present invention relates to the fuel production device including the internal combustion engine, an electrolysis device connected to the internal combustion engine, and a hydrogenation reactor connected to the electrolysis device, wherein the electrolysis device is a device for decomposing high-temperature water vapor contained in the exhaust gas from the internal combustion engine into hydrogen and oxygen, and the hydrogenation reactor is a device for converting the hydrogen resulting from the decomposition to the fuel.

5 Claims, 9 Drawing Sheets

(51) Int. Cl.
  *F01N 3/08* (2006.01)
  *F02M 25/12* (2006.01)
  *F02M 27/04* (2006.01)
  *F02M 31/20* (2006.01)

(58) Field of Classification Search
  CPC ........ F02M 25/12; F02M 27/04; F02M 31/20; Y02P 20/133
  See application file for complete search history.

(56) References Cited

U.S. PATENT DOCUMENTS

| | | |
|---|---|---|
| 2016/0017800 A1 | 1/2016 | Simpson |
| 2016/0153316 A1 | 6/2016 | Bergins et al. |
| 2016/0369688 A1* | 12/2016 | Hamad .................... C25B 1/00 |

FOREIGN PATENT DOCUMENTS

| | | | |
|---|---|---|---|
| JP | 2009-007647 A | | 1/2009 |
| JP | WO 2012161264 | * | 11/2012 |
| JP | 2015-513531 A | | 5/2015 |
| JP | 2015209576 | * | 11/2015 |
| JP | 2016-531973 A | | 10/2016 |
| JP | 2018-523046 A | | 8/2018 |
| WO | 2012/147157 A1 | | 11/2012 |

* cited by examiner

FUEL PRODUCTION DEVICE

TECHNICAL FIELD

The present invention relates to a fuel production device.

BACKGROUND ART

In recent years, it has been attempted to effectively use energy in order to preserve global environment and save resources.

For example, Patent Literature 1 describes a method of generating, from an electrical energy source, a hydrocarbon or a hydrocarbon derivative, which includes a step a. of providing the electrical energy source, a step b. of using an electrical energy from the electrical energy source to electrolyze water and generate hydrogen and oxygen, and a step c. of using the generated hydrogen to hydrogenate a carbon dioxide and generate methane. In the method of concern, as the electrical energy source, a renewable energy source is used.

CITATION LIST

Patent Literature

Patent Literature 1: Japanese Translation of PCT Application No. 2015-513531

SUMMARY OF INVENTION

Technical Problem

Meanwhile, it is also a task to efficiently use a thermal energy discharged from a conventionally used internal combustion engine.

It is therefore a task of the present invention to provide a device that uses a high-temperature exhaust gas released from an internal combustion engine to produce a fuel.

Solution to Problem

As a result of examining various means for carrying out the task, the present inventors have found that, by using an electrolysis device to decompose high-temperature water vapor contained in an exhaust gas discharged from an internal combustion engine into hydrogen and oxygen and convert the hydrogen resulting from the decomposition in a high-temperature state to a fuel, it is possible to produce the fuel by efficiently use an energy from the internal combustion engine.

In other words, the present invention is a fuel production device including an internal combustion engine, an electrolysis device connected to the internal combustion engine of concern, and a hydrogenation reactor connected to the electrolysis device of concern, wherein the electrolysis device is a device for decomposing high-temperature water vapor contained in an exhaust gas from the internal combustion engine into hydrogen and oxygen, and the hydrogenation reactor is a device for converting the hydrogen resulting from the decomposition to a fuel.

Advantageous Effect of Invention

According to the present invention, the device that uses the high-temperature exhaust gas released from the internal combustion engine to produce the fuel is provided. Tasks, configurations, and effects other than those described above will be made apparent by the following description of embodiments.

DESCRIPTION OF EMBODIMENTS

Using drawings or the like, a description will be given below of embodiments of the present invention. In the drawings, the size and shape of each part are exaggerated for clarity, and the actual size and shape are not accurately depicted. Therefore, the technical scope of the present invention is not limited to the size and shape of each part illustrated in these drawings. In addition, the following description shows specific examples of details of the present invention, and the present invention is not limited to description thereof and can variously be changed and modified by a person skilled in the art within a scope of a technical idea disclosed in the present description. Throughout the drawings for describing the present invention, the same reference signs are given to components having the same functions, and a repeated description thereof may be omitted.

The present invention relates to a fuel production device including an internal combustion engine, an electrolysis device connected to the internal combustion engine of concern, and a hydrogenation reactor connected to the electrolysis device of concern, wherein the electrolysis device is a device for decomposing high-temperature water vapor contained in an exhaust gas from the internal combustion engine into hydrogen and oxygen, and the hydrogenation reactor is a device for converting the hydrogen resulting from the decomposition to a fuel.

The internal combustion engine mentioned herein in the present invention indicates an internal combustion engine using a working fluid as a combustion gas, examples of which include a reciprocal engine, a rotary engine, and the like.

The internal combustion engine in the fuel production device of the present invention can quickly be activated and/or stopped. When a renewable energy source is used as an electric power to be used for electrolysis in the electrolysis device, the internal combustion engine can easily follow a fluctuating extra power derived from the renewable energy source. In addition, the internal combustion engine in the fuel production device of the present invention can reduce a heater operation time of the fuel production device.

Moreover, in the internal combustion engine, bioethanol or water-containing ethanol can be used as an auxiliary fuel.

By using the bioethanol as the auxiliary fuel in the internal combustion engine, it is possible to reduce emission of carbon dioxide, which is listed as one of causes of global warming.

Combustion in the internal combustion engine is performed at a known temperature in the technical field of concern, and is performed at typically 300° C. to 900° C., or preferably 500° C. to 700° C.

The combustion performed in the internal combustion engine at a temperature in the range mentioned above allows an external device, e.g., a power generator to operate with a mechanical power from the internal combustion engine. A temperature of the exhaust gas discharged from the internal combustion engine of concern is typically 250° C. to 850° C., preferably 350° C. to 650° C., or, e.g., 350° C. to 550° C. The temperatures of concern correspond to temperatures for electrolysis in the electrolysis device described below, and therefore water vapor contained in the exhaust gas is efficiently decomposed into hydrogen in the electrolysis device, as will be described below.

Additionally, the internal combustion engine is preferably operated after being conditioned (adjusted) so as to effect stoichiometric combustion (stoichiometry hereinafter referred to as stoichiometric combustion) in which an air-fuel ratio (Air/Fuel ratio) is a theoretical air-fuel ratio.

When the internal combustion engine is operated in a lean atmosphere in which an air ratio is higher than in the stoichiometric combustion, the exhaust gas to be supplied to the electrolysis device may contain oxygen ($O_2$). When the oxygen is supplied to the electrolysis device, electrolysis of the water vapor in the electrolysis device may be suppressed.

Accordingly, by operating the internal combustion engine in the stoichiometric combustion in the fuel production device of the present invention, the exhaust gas discharged from the internal combustion engine contains no oxygen, and it is possible to prevent a reduction in efficiency of the electrolysis of the water vapor in the electrolysis device to which the exhaust gas is supplied, consumption of the generated hydrogen, and the like. For the reason described above, as the internal combustion engine in the present embodiment, a spark ignition engine appropriate for operation in the stoichiometric combustion is preferred.

In the fuel production device of the present invention, the internal combustion engine is connected to the electrolysis device, and the exhaust gas discharged from the internal combustion engine is supplied to the electrolysis device.

The electrolysis device in the present invention is a device for performing electrolysis referred to as high-temperature electrolysis or water vapor electrolysis performed at a temperature higher than a room temperature, e.g., typically 250° C. to 850° C., preferably 350° C. to 650° C., or, e.g., 350° C. to 550° C.

As described above, the exhaust gas discharged from the internal combustion engine is at the temperature in the foregoing range in which the electrolysis device is operated. By effecting the electrolysis in the electrolysis device at the foregoing temperature, it is possible to electrolyze the water vapor with high efficiency and generate the hydrogen.

In the electrolysis device, the following reaction occurs.

Negative Electrode: $H_2O + 2e^- \rightarrow O^{2-} + H_2\uparrow$

Positive Electrode: $O^{2-} \rightarrow 2e^- + \tfrac{1}{2}O_2\uparrow$

Entire Device: $H_2O \rightarrow H_2 + \tfrac{1}{2}O_2$

In other words, in the electrolysis device, the water vapor contained in the exhaust gas supplied to a negative electrode receives electrons to be decomposed into hydrogen and an oxygen ion ($O^{2-}$), and the oxygen ion generated from the negative electrode moves to a positive electrode via an electrolyte located between the negative electrode and the positive electrode to generate oxygen in the positive electrode.

The electrolysis device may also include, as the electrolyte, a solid oxide electrolyte. Examples of the solid oxide electrolyte include yttria-stabilized zirconia ("YSZ" or $Y_2O_3$-added $ZrO_2$).

Due to the hermetic solid oxide electrolyte included in the electrolysis device, the oxygen ion excellently conducts at a high temperature to be able to further accelerate separation of the hydrogen and the oxygen ion from each other.

The electrolysis device includes, as electrodes, electrodes known in the technical field of concern, and may also use, e.g., nickel cermet vapor/hydrogen electrodes.

For electric power to be used for the electrolysis in the electrolysis device, a renewable energy source is used preferably. As the renewable energy source, at least one energy selected from the group consisting of wind power energy, tidal power energy, wave power energy, water power energy, geothermal energy, and solar energy can be listed.

By using the renewable energy source for the electric power to be used for the electrolysis in the electrolysis device, it is possible to inhibit emission of carbon dioxide which is listed as one of causes of global warming, and efficiently use the variable extra power of the renewable energy.

In the electrolysis device, the water vapor contained in the exhaust gas is electrolyzed as described above but, since the exhaust gas may contain, in addition to the water vapor, toxic substances (such as carbon monoxide (CO), unburned hydrocarbon (HC), and a nitrogen oxide ($NO_x$)), the fuel production device of the present invention may also further include, between the internal combustion engine and the electrolysis device, a device for decomposing and/or removing the toxic substances other than the water vapor. For example, the fuel production device of the present invention further includes, between the internal combustion engine and the electrolysis device, a catalyst for purifying the exhaust gas such as a three-way catalyst.

Due to the catalyst for purifying the exhaust gas which is further included by the fuel production device of the present invention, the toxic substances in the exhaust gas discharged from the internal combustion engine are efficiently decomposed and/or removed, and it is possible to prevent degradation and/or corrosion or the like of the electrolysis device to which the exhaust gas is supplied due to the toxic substances.

In the fuel production device of the present invention, the oxygen generated in the electrolysis device may also be supplied to the internal combustion engine for combustion in the internal combustion engine.

By supplying the oxygen generated in the electrolysis device to the internal combustion engine, it is possible to improve combustion efficiency in the internal combustion engine.

In the fuel production device of the present invention, the electrolysis device is connected to the hydrogenation reactor, and the hydrogen generated in the electrolysis device is supplied to the hydrogenation reactor.

The hydrogenation reactor is a device for converting the hydrogen generated in the electrolysis device to a highly operable fuel. Examples of the hydrogenation reactor include a methanation reactor that causes a reaction between hydrogen and carbon dioxide to generate methane, an organic hydride reactor that causes a reaction between hydrogen and toluene to generate methylcyclohexane (MCH), and the like.

When the methanation reactor is used as the hydrogenation reactor, the following reaction occurs in the methanation reactor.

$$CO_2 + 4H_2 \rightarrow CH_4 + 2H_2O$$

The methanation reaction is referred to also as a Sabatier reaction, and this reaction is known in the technical field of concern.

To start the Sabatier reaction, a temperature of typically 200° C. to 300° C., e.g., 200° C. to 250° C., or 250° C. to 300° C. is required. In the fuel production device of the present invention, the hydrogen generated in the electrolysis device operated at a high temperature is also at a high temperature. Accordingly, the hydrogen generated in the electrolysis device need not be heated, and can be supplied to the methanation reactor after being adjusted to the temperature range of concern by using a cooling device or a cooling water line as described below, which allows the Sabatier reaction to be efficiently started.

The carbon dioxide used in the Sabatier reaction may be supplied appropriately from the outside, but the carbon dioxide contained in the exhaust gas is used preferably. When discharged without alteration, the carbon dioxide contained in the exhaust gas causes global warming. Accordingly, by using the carbon dioxide contained in the exhaust gas in the reaction of concern, it is possible to reduce an amount of carbon dioxide emission. In addition, the carbon dioxide contained in the exhaust gas is not decomposed and/or reacted in the electrolysis device disposed between the internal combustion engine and the methanation reactor, and consequently the high temperature is held in the internal combustion engine and the electrolysis device. Therefore, through supply of the carbon dioxide contained in the exhaust gas to the methanation reactor similar to that of the hydrogen described above, the Sabatier reaction can be efficiently started.

Meanwhile, when the Sabatier reaction, which is an exoergic reaction, is started, it is normally required to cool a reaction system. When a reaction temperature significantly exceeds 300° C., a reverse reaction is prioritized to result in reduced efficiency, and accordingly the reaction temperature is preferably maintained at a temperature around 300° C. through use of a cooling device or a cooling water line as described below. The reaction temperature is typically 200° C. to 400° C., e.g., 200° C. to 250° C., preferably 220° C. to 350° C., more preferably 220° C. to 260° C., or still more preferably 220° C. to 250° C.

In the Sabatier reaction, a catalyst is used. The catalyst is not limited, and a catalyst known in the technical field of concern can be used. Examples of the catalyst include a ruthenium-supported aluminum catalyst and a nickel catalyst. By using the catalyst of concern, it is possible to obtain an excellent selectivity.

By using the methanation reactor as the hydrogenation reactor in the fuel production device of the present invention, it is possible to effectively use the carbon dioxide discharged from the internal combustion engine, further use the high-temperature hydrogen and carbon dioxide discharged from the electrolysis device for the reaction without further heating the hydrogen and carbon dioxide, and achieve more efficient use of energy. In addition, methane resulting from the hydrogenation can also be input as a fuel to the internal combustion engine or can also be pipeline transported.

In a case of using the organic hydride reactor as the hydrogenation reactor, when toluene or methylcyclohexane is used as an example of the organic hydride, the following reaction occurs.

$$C_6H_5CH_3 + 3H_2 \rightarrow C_6H_{11}CH_3$$

The organic hydride reactor will be described using an example using the methylcyclohexane mentioned above. While each of the methylcyclohexane and toluene in the foregoing reaction is a cyclic hydrocarbon having the same carbon number, the methylcyclohexane is a saturated hydrocarbon having no double bond, and the toluene is an unsaturated hydrocarbon having a portion in which carbons are double-bonded. In other words, the toluene is obtained by a dehydrogenation reaction of the methylcyclohexane, and the methylcyclohexane is obtained by a hydrogenation reaction of the toluene. Accordingly, by using the dehydrogenation reaction and the hydrogenation reaction of these hydrocarbons, the organic hydride reactor of concern allows hydrogen to be supplied and stored.

When the toluene and the methylcyclohexane are used as the organic hydrides, to start the hydrogenation reaction, a temperature of typically 70° C. to 100° C., preferably 80° C. to 100° C., or more preferably 80° C. to 90° C. is required. In the fuel production device of the present invention, the hydrogen generated in the electrolysis device operated at the high temperature is also at the high temperature. Accordingly, the hydrogen generated in the electrolysis device need not be heated, and can be supplied to the methanation reactor after being adjusted to the temperature range of concern by using a cooling device or a cooling water line as described below, which allows the hydrogenation reaction to be efficiently started.

Meanwhile, when the hydrogenation reaction, which is an exoergic reaction, is started, it is normally required to cool a reaction system. When a reaction temperature significantly exceeds a boiling temperature of 100.9° C. of the methylcyclohexane under an atmospheric pressure, efficiency deteriorates, and accordingly the reaction temperature is preferably maintained at a temperature around 100° C. through use of a cooling device or a cooling water line as described below. A temperature range is typically 80° C. to 100° C., preferably 85° C. to 98° C., or more preferably 85° C. to 96° C.

When a compound obtained through the hydrogenation reaction in the organic hydride is assumed to be a hydrogenated material and a compound obtained through the dehydrogenation reaction therein is assumed to be a dehydrogenated material, as the hydrogenated material that can be used in the organic hydride reactor, a chain saturated hydrocarbon or a cyclic saturated hydrocarbon can be listed. Examples of the chain saturated hydrocarbon include pentane, hexane, heptane, octane, nonane, decane, undecane, dodecane, structural isomers thereof, and substitution products thereof. Examples of the cyclic saturated hydrocarbon include cyclobutane, cyclopentane, cyclohexane, cycloheptane, cyclooctane, cyclononane, and alkyl substitution products thereof. Examples of the alkyl substitution products of the cyclic saturated hydrocarbons include the methylcyclohexane mentioned above and the like. It may also be possible to use a plurality of the singly bonded cyclic saturated hydrocarbons. Examples of such compounds include bicyclohexane and the like.

As the hydrogenated material that can be used in the organic hydride reactor, a bicyclic saturated hydrocarbon can further be listed. Examples of the bicyclic saturated hydrocarbon include decalin, tetralin, and alkyl substitution products thereof. Examples of the alkyl substitution products of the bicyclic saturated hydrocarbon include methyldecalin and the like.

Note that, in the case of retrieving hydrogen from the hydrogenated material by using the catalyst shown below, as the hydrogenated material, not only any one selected from the group consisting of the compounds mentioned above may be used, but also two or more selected from the group consisting of the compounds mentioned above may be used in a mixture as long as the hydrogen, the dehydrogenated material, and the unreacted hydrogenated material can be separated from each other. In addition, the hydrogenated material may also appropriately contain another compound such as, e.g., a hydrocarbon having no involvement in the hydrogenation reaction or the dehydrogenation reaction or an additive such as a stabilizer as long as there is no interference with the hydrogenation reaction and/or the dehydrogenation reaction in the catalyst described below.

As the catalyst that can be used when the hydrogen is retrieved from the hydrogenated material, a catalyst including a metal catalyst and a carrier carrying the metal catalyst can be listed. Preferably, the catalyst of concern further includes a holder for holding the carrier.

As examples of the metal catalyst, particles formed of one or more transition metals selected from the group consisting of nickel (Ni), palladium (Pd), platinum (Pt), rhodium (Rh), iridium (Ir), rhenium (Re), ruthenium (Ru), molybdenum (Mo), tungsten (W), vanadium (V), osmium (Os), chromium (Cr), cobalt (Co), and iron (Fe) or alloys thereof can be used preferably. The size of each of the particles of the metal catalyst that can be used is, e.g., an average particle diameter of 1 nm to 10 nm or, e.g., about 2 nm, but is not limited thereto. The particle may have any size as long as it is possible to cause the dehydrogenation reaction of the hydrogenated material.

Examples of the carrier include activated carbon, carbon nanotube, silica, alumina, alumina silicate such as zeolite, porous polyimide, zinc oxide, zirconium oxide, diatom earth, niobium oxide, vanadium oxide, and the like. The carrier of concern may have any form in accordance with a fixed form of the catalyst.

By using the organic hydride reactor as the hydrogenation reactor in the fuel production device of the present invention and by using, for the reaction, the high-temperature hydrogen discharged from the electrolysis device without further heating the hydrogen, it is possible to achieve more efficient use of energy. In addition, by liquidizing the hydrogenated material obtained through hydrogenation (into, e.g., methylcyclohexane), it is possible to improve storability, transportability, and operability. In addition, the liquid fuel allows infrastructure of gasoline to be utilized.

Figure 1:
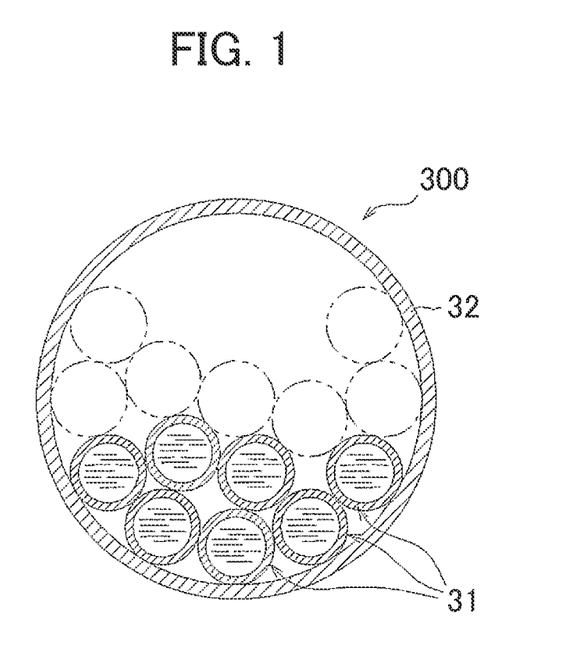
FIG. 1 is a diagram schematically illustrating an example of a hydrogenation reactor.

Subsequently, a configuration of the hydrogenation reactor will be described. FIG. 1 schematically illustrates an example of the hydrogenation reactor.

As illustrated in FIG. 1, a hydrogenation reactor 300 includes a plurality of reaction cells 31 each exhibiting a cylindrical outer shape and a cylindrical first casing 32 for containing the plurality of reaction cells 31. The hydrogenation reactor 300 is configured such that the carbon dioxide contained in the exhaust gas, a gas containing the hydrogen produced in the electrolysis device, and a dehydrogenated material such as, e.g., toluene vapor flow in each of the reaction cells 31, while cooling water flows in the first casing 32 outside the reaction cells 31.

Figure 2:
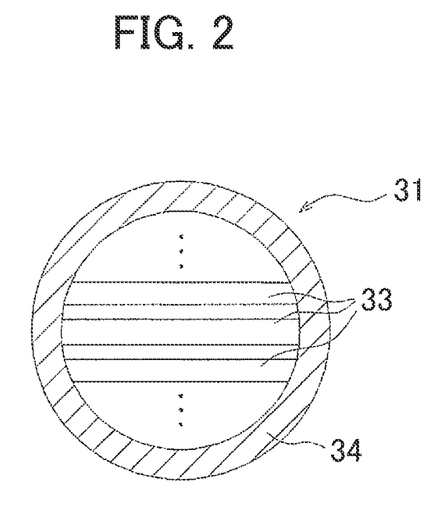
FIG. 2 is a diagram schematically illustrating an example of a reaction cell in the hydrogenation reactor.

The first casing 32 and a second casing 34 described below are formed of a metal (e.g., SUS) so as to have a high heat conductivity. Note that shapes of the first casing 32 and the second casing 34 are not limited to cylindrical shapes, and may also be, e.g., quadratic prisms or polygonal cylinders.

As illustrated in FIG. 2, each of the reaction cells 31 includes a plurality of stacked reaction sheets 33 and the second casing 34 for containing the plurality of reaction sheets 33.

Figure 3:
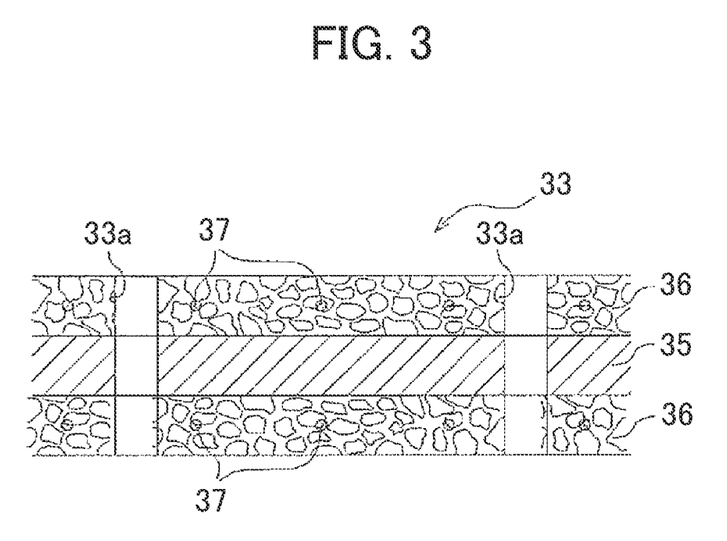
FIG. 3 is a diagram schematically illustrating an example of a reaction sheet in the reaction cell in the hydrogenation reactor.

As illustrated in FIG. 3, each of the reaction sheets 33 includes a metal foil 35 serving as a base, porous layers 36 formed on both surfaces of the metal foil 35, and catalysts 37 carried by the porous layers 36. In other words, each of the reaction sheets 33 has a three-layer structure in which the porous layer 36 carrying the catalysts 37, the metal foil 35, and the porous layer 36 carrying the catalysts 37 are stacked in this order.

Note that, between the reaction sheets 33 adjacent to each other in a thickness direction, a gap is formed to allow the carbon dioxide, water vapor, the generated hydrogen, and the dehydrogenated material such as, e.g., toluene vapor, which are gas components, to flow therethrough.

The reaction sheet 33, which is in the form of a sheet, has a small heat capacity to rapidly conduct heat, and is rapidly adjusted to a temperature at which the catalysts 37 excellently perform a catalyst function thereof. As a result, the hydrogen supplied from the electrolysis device reacts with the carbon dioxide or toluene to be efficiently converted to a hydrogenated material such as methane or methylcyclohexane.

In addition, each of the reaction sheets 33 has a plurality of through holes 33$a$ formed therein. As a result, the carbon dioxide, the water vapor, and the generated hydrogen and dehydrogenated material such as, e.g., toluene vapor, which are the gas components, excellently flows through the through holes 33$a$ even in the thickness direction.

The metal foil 35 is formed of, e.g., an aluminum foil and has a thickness of typically 50 μm to 200 μm.

However, it may also be possible that each of the reaction sheets 33 does not include the metal foil 35 or includes the porous layer 36 serving as the base instead of the metal foil 35, and the entire reaction sheet 33 has a porous structure.

The porous layers 36 are layers for supporting the catalysts 37, and have a plurality of tiny holes through which the carbon dioxide, the water vapor, and the generated hydrogen and dehydrogenated material such as, e.g., toluene vapor, which are the gas components, can flow. The porous layers 36 thus described are formed of, e.g., an oxide containing alumina as a main component.

The catalysts 37 are catalysts for generating methane or a hydrogenated material from the generated hydrogen and carbon dioxide or a dehydrogenated material such as toluene vapor, which are the gas components. These catalysts 37 are as described above, and may differ depending on a hydrogenation reaction. Examples of the representative catalyst include at least one selecting from the group consisting of, e.g., platinum, nickel, palladium, rhodium, iridium, ruthenium, molybdenum, rhenium, tungsten, vanadium, osmium, chromium, cobalt, iron, and the like.

The fuel production device of the present invention may also include a cooling device or a cooling water line so as to adjust a temperature of the hydrogen to be supplied to the hydrogenation reactor or the like or a reaction temperature in the hydrogenation reactor.

In the fuel production device of the present invention, it may also be possible to connect the internal combustion engine, the hydrogenation reactor, and optionally the cooling device with the cooling water line for cooling the internal combustion engine.

The cooling device mentioned herein is a device for adjusting a temperature of the hydrogen to be supplied to the hydrogenation reactor or the like, while the cooling water line is a device for appropriately adjusting a temperature of the internal combustion engine, the cooling device, and/or the hydrogenation device. As the cooling device and the cooling water line, a cooling device and a cooling water line which are known in the technical field of concern can be used.

For example, when the methanation reactor is used as the hydrogenation reactor in the fuel production device of the present invention, by connecting the internal combustion engine and the methanation reactor with the cooling water line, it is possible to adjust a temperature of the methanation reactor to an appropriate reaction temperature. In addition, by disposing a cooling device that performs cooling with discharged water between the electrolysis device and the methanation reactor, it is possible to adjust the generated hydrogen and carbon dioxide into a temperature range appropriate for a methanation reaction starting temperature and, by supplying the discharged water reaching a high temperature due to heat exchange in the cooling device of concern as high-temperature water or water vapor to the electrolysis device, it is possible to improve energy efficiency. Note that, as the discharged water to be used in the cooling device, water contained in a methane mixture gas generated in the methanation reactor can be used. Separation of the water from the methane mixture gas can be carried out by a method of cooling the methane mixture gas to 100° C. or less in the cooling device disposed in a stage subsequent to the methanation reactor and separating gaseous methane and liquid water from each other.

For example, when the organic hydride reactor is used as the hydrogenation reactor in the fuel production device of the present invention, by connecting the internal combustion engine and the organic hydride reactor with the cooling water line, it is possible to appropriately adjust the reaction temperature in the organic hydride reactor. In addition, by disposing the cooling device between the electrolysis device and the organic hydride reactor, it is possible to adjust the generated hydrogen into a temperature range appropriate for a hydrogenation reaction starting temperature and, by removing excess water vapor from a hydrogen gas supplied to the organic hydride reactor, it is possible to improve reaction efficiency in the organic hydride reactor.

Figure 4:
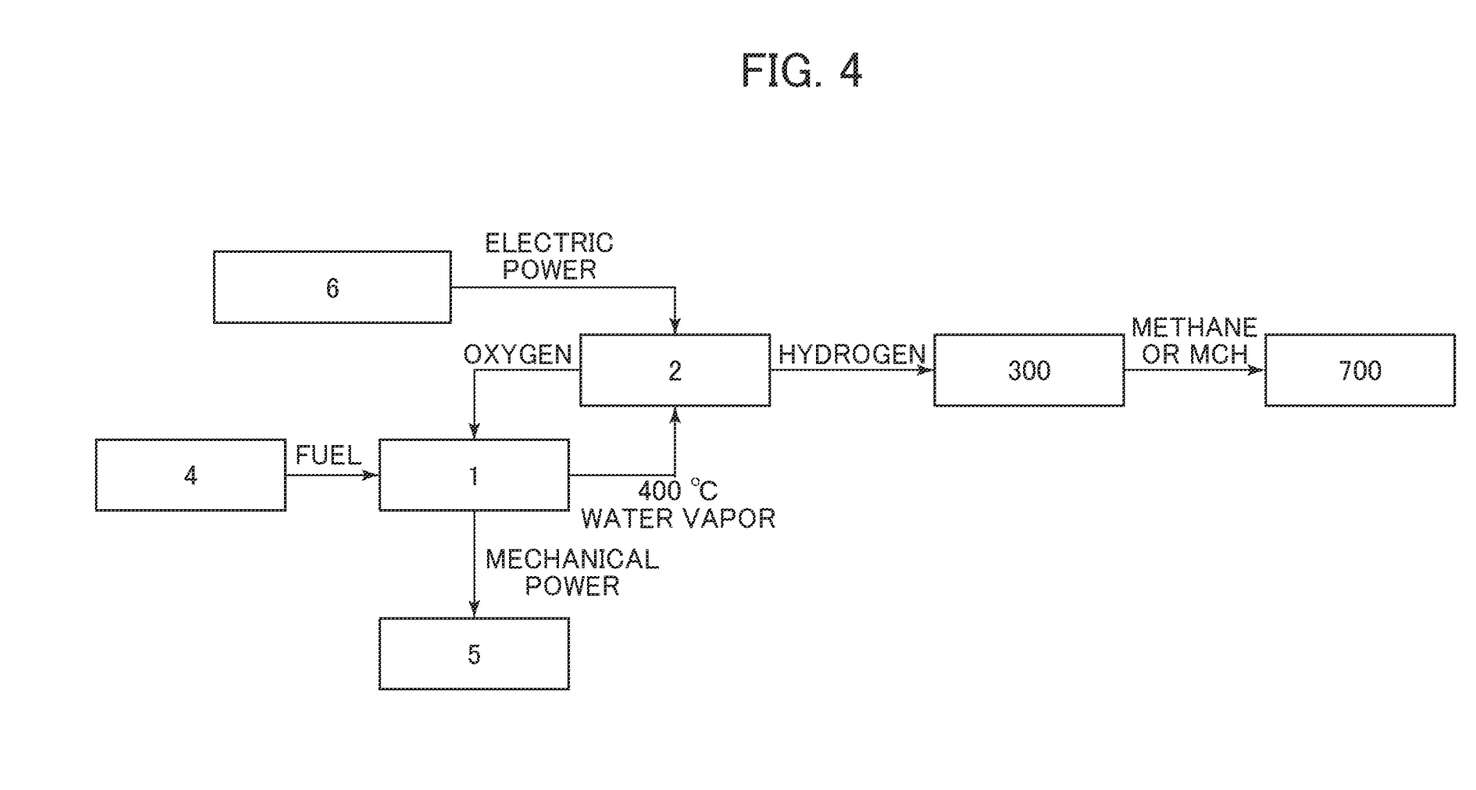
FIG. 4 is a diagram illustrating a configuration of a first embodiment of a fuel production device of the present invention.

FIG. 4 illustrates a configuration of a first embodiment of the fuel production device of the present invention. The configuration of the first embodiment includes, in series, an internal combustion engine 1, an electrolysis device 2 connected to the internal combustion engine 1 of concern, and the hydrogenation reactor 300 connected to the electrolysis device 2 of concern. To the internal combustion engine 1, a fuel tank 4 for supplying a fuel to the internal combustion engine 1 and a power generator 5 operated by a mechanical power from the internal combustion engine 1 are further connected, and the connection between the internal combustion engine 1 and the electrolysis device 2 includes piping for supplying the exhaust gas from the internal combustion engine 1 to the electrolysis device 2 and piping for supplying oxygen generated from the electrolysis device 2 to the internal combustion engine 1. To the electrolysis device 2, a renewable energy source 6 for supplying an electric power to the electrolysis device 2 is further connected. To the hydrogenation reactor 300, a storage tank 700 for storing the fuel generated in the hydrogenation reactor 300 is further connected.

In the configuration of the first embodiment, the fuel supplied from the fuel tank 4 to the internal combustion engine 1 is burned to generate 400° C. water vapor and a mechanical power, and the 400° C. water vapor is supplied to the electrolysis device 2, while the mechanical power is transmitted to the power generator 5. At this time, by adjusting a ratio between the fuel and oxygen to be supplied to the internal combustion engine 1 so as to effect the stoichiometric combustion, the oxygen is substantially entirely consumed during the combustion and prevented from being contained in an exhaust gas. Subsequently, the 400° C. water vapor supplied to the electrolysis device 2 operated by the renewable energy source 6 is decomposed into oxygen and hydrogen by the high temperature electrolysis, and the oxygen is supplied to the internal combustion engine 1, while the hydrogen is supplied to the hydrogenation reactor 300. The hydrogen supplied to the hydrogenation reactor 300 is converted to a fuel of methane or methylcyclohexane (MCH), which is stored in the storage tank 700.

In the configuration of the first embodiment, the hydrogen generated in the electrolysis device 2 is supplied at the high temperature to the hydrogenation reactor 300 connected in series to the electrolysis device 2. Accordingly, the hydrogen need not be heated for a hydrogenation reaction, and can be converted to an easy-to-store form.

Figure 5:
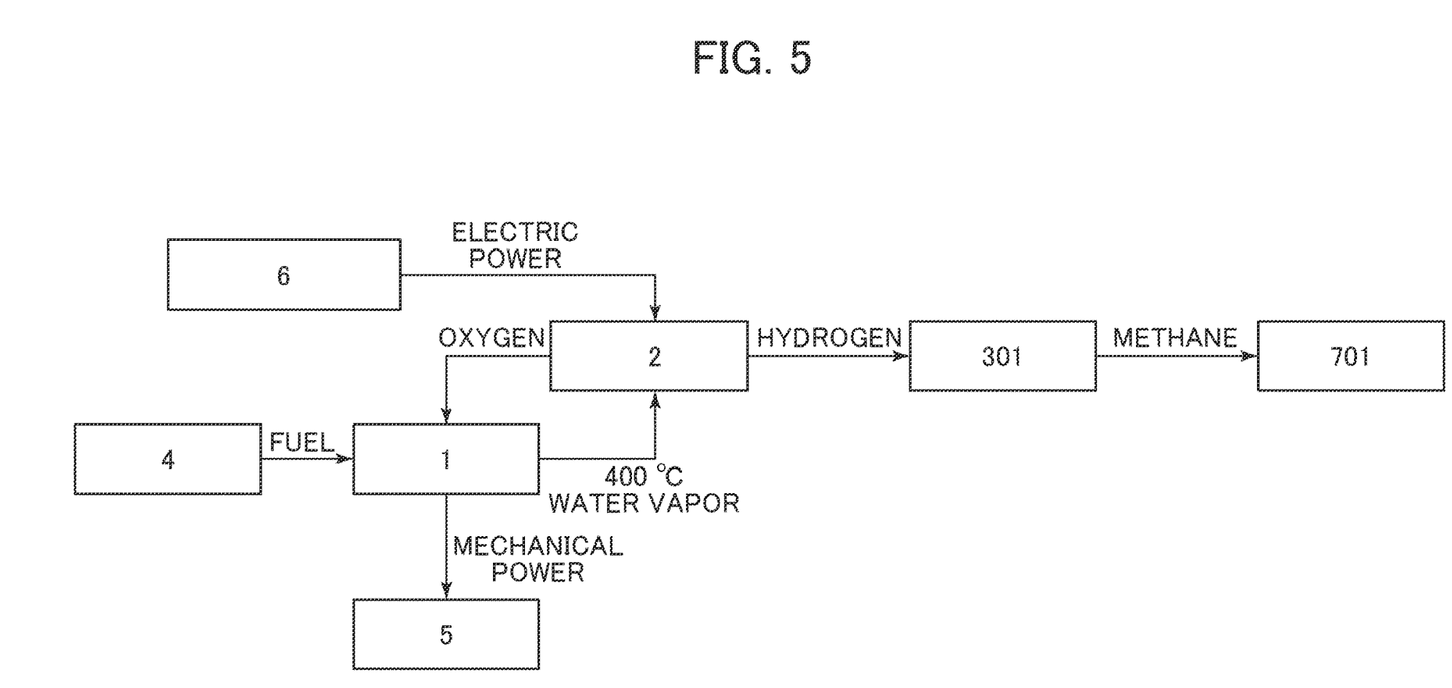
FIG. 5 is a diagram illustrating a configuration of a second embodiment of the fuel production device of the present invention.

FIG. 5 illustrates a configuration of a second embodiment using a methanation reactor 301 as the hydrogenation reactor in the fuel production device of the present invention. The configuration of the second embodiment includes the internal combustion engine 1, the electrolysis device 2 connected to the internal combustion engine 1 of concern, and the methanation reactor 301 connected to the electrolysis device 2 of concern. To the internal combustion engine 1, the fuel tank 4 for supplying the fuel to the internal combustion engine 1 and the power generator 5 operated by the mechanical power from the internal combustion engine 1 are further connected, and the connection between the internal combustion engine 1 and the electrolysis device 2 includes piping for supplying the exhaust gas from the internal combustion engine 1 to the electrolysis device 2 and piping for supplying the oxygen generated from the electrolysis device 2 to the internal combustion engine 1. To the electrolysis device 2, the renewable energy source 6 for supplying the electric power to the electrolysis device 2 is further connected. To the methanation reactor 301, a methane storage tank 701 for storing methane generated in the methanation reactor 301 is further connected. Note that, between the electrolysis device 2 and the methanation reactor 301, a cooling device for adjusting hydrogen, carbon dioxide, and the like serving as raw materials for the methanation reaction to a temperature appropriate as a methanation reaction starting temperature, e.g., a heat exchanger may also be disposed. The internal combustion engine 1 and the methanation reactor 301 may also be connected with a cooling water line.

In the configuration of the second embodiment, the fuel supplied from the fuel tank 4 to the internal combustion engine 1 is burned first to generate 400° C. water vapor, carbon dioxide, and a mechanical power, and the 400° C.

water vapor and the carbon dioxide are supplied to the electrolysis device 2, while the mechanical power is transmitted to the power generator 5. At this time, by adjusting the ratio between the fuel and oxygen to be supplied to the internal combustion engine 1 so as to effect the stoichiometric combustion, the oxygen is substantially entirely consumed during the combustion and prevented from being contained in the exhaust gas. Subsequently, the 400° C. water vapor supplied to the electrolysis device 2 operated by the renewable energy source 6 is decomposed by the high temperature electrolysis into oxygen and hydrogen, and the oxygen is supplied to the internal combustion engine 1, while the hydrogen is supplied to the methanation reactor 301. Note that the carbon dioxide contained in the exhaust gas is also supplied to the methanation reactor without being electrolyzed. The hydrogen and carbon dioxide supplied to the methanation reactor are converted to the methane, which is stored in the methane storage tank 701. Note that a gas temperature (outlet-side gas temperature) of the methane discharged from the methanation reactor 301 is preferably set to 220° C. to 250° C. by the cooling device and/or the cooling water line disposed in a stage previous to the methanation reactor 301.

In the configuration of the second embodiment, the hydrogen generated in the electrolysis device 2 and the carbon dioxide contained in the exhaust gas are supplied at the high temperature to the methanation reactor 301 connected in series to the electrolysis device 2. Accordingly, the hydrogen and carbon dioxide need not be heated for methanation, and can be converted to easy-to-store methane.

Figure 6:
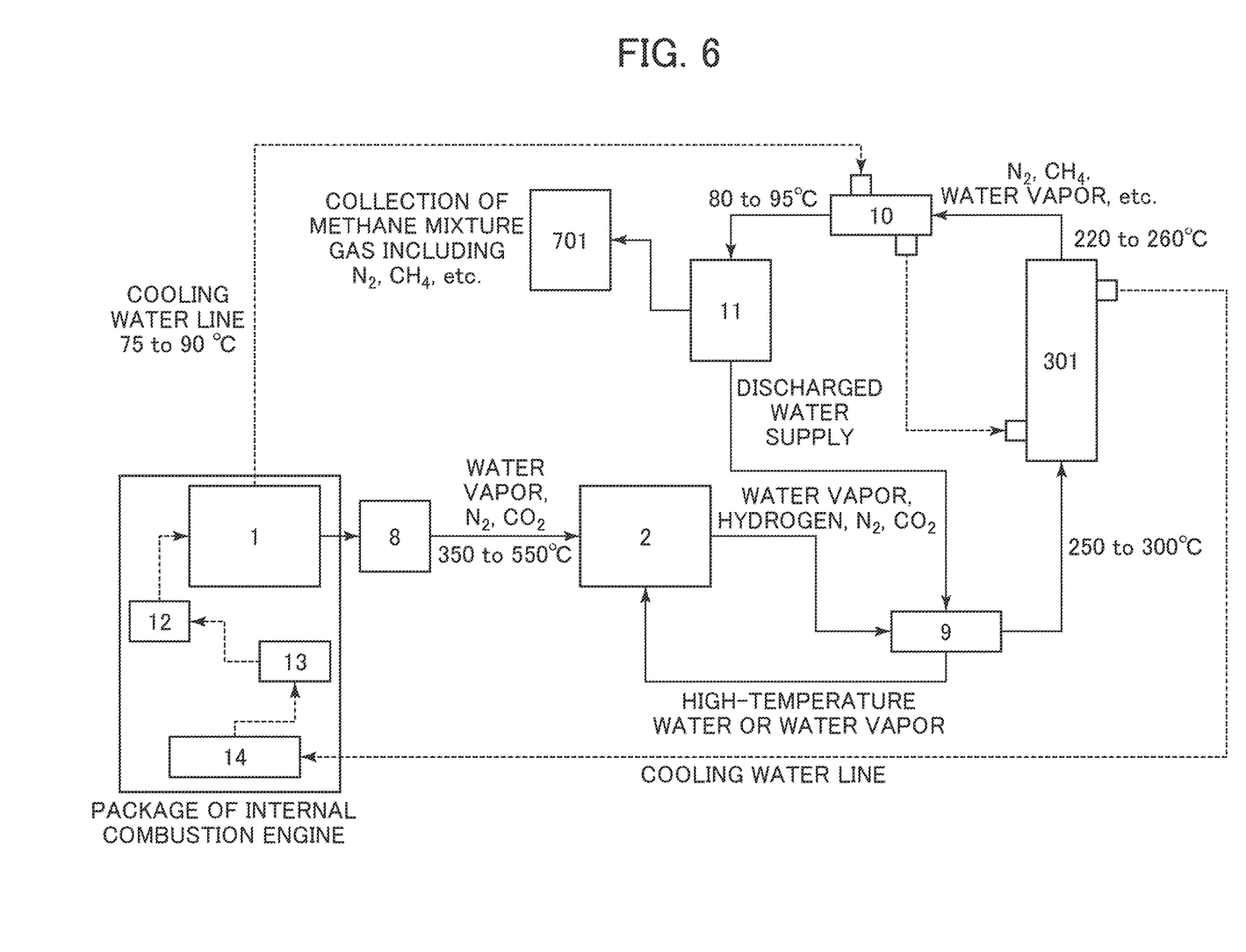
FIG. 6 is a diagram illustrating a configuration of a third embodiment of the fuel production device of the present invention.

FIG. 6 illustrates a configuration of a third embodiment into which the second embodiment is further embodied. The configuration of the third embodiment includes, in series, the internal combustion engine 1, a three-way catalyst 8 connected to the internal combustion engine 1 of concern to remove toxic substances, the electrolysis device 2 connected to the three-way catalyst 8 of concern, a first cooling device 9 for adjustment to a temperature appropriate for the methanation reaction which is connected to the electrolysis device 2 of concern, and the methanation reactor 301 connected to the first cooling device 9 of concern. In a stage subsequent to the methanation reactor 301, a second cooling device 10 for cooling water (water vapor) generated in the methanation reactor 301 is connected. In a stage subsequent to the second cooling device 10, a water collection tank 11 for collecting the cooled water is connected. In a stage subsequent to the water collection tank 11, the methane storage tank 701 for collecting a generated methane mixture gas is connected. The internal combustion engine 1 further includes a cooling water line (including a cooling water pump 12, a cooling water tank 13, and a radiator 14) connecting the internal combustion engine 1, the second cooling device 10, and the methanation reactor 301. To the first cooling device 9, piping for supplying discharged water that may serve as a cooling medium from the water collection tank 11 and piping for supplying high-temperature discharged water or water vapor resulting from heat exchange in the first cooling device 9 are further connected.

In the configuration of the third embodiment, first, the fuel supplied from the fuel tank to the internal combustion engine, e.g., methane is burned to generate water vapor and carbon dioxide at 350° C. to 550° C. ($CH_4+2O_2\rightarrow CO_2+2H_2O$ (Formula 1)), and the high-temperature water vapor and carbon dioxide of concern are subjected to removal of toxic substances (such as unburned hydrocarbon, carbon monoxide, and nitric oxide) therefrom in the three-way catalyst 8, and then supplied to the electrolysis device 2. At this time, by adjusting the ratio between the fuel and oxygen to be supplied to the internal combustion engine 1 so as to effect the stoichiometric combustion, the oxygen is prevented from being contained in the exhaust gas. Subsequently, the high-temperature water vapor supplied to the electrolysis device 2 is decomposed by the high temperature electrolysis into oxygen and hydrogen ($CO_2+2H_2O\rightarrow 2H_2+CO_2+O_2$ (Formula 2)), and the hydrogen is adjusted to 250° C. to 300° C. appropriate as the methanation reaction starting temperature in the first cooling device 9 and then supplied to the methanation reactor 301. Note that the hydrogen and carbon dioxide contained in the exhaust gas are also supplied to the methanation reactor 301 without being electrolyzed. The hydrogen and carbon dioxide supplied to the methanation reactor 301 are converted at an appropriate reaction temperature of 220° C. to 260° C. resulting from adjustment by the cooling water line to methane and water vapor ($2H_2+2H_2+CO_2\rightarrow CH_4+2H_2O$ (Formula 3)). The methane and water vapor resulting from the conversion are supplied at a temperature of 220° C. to 260° C. from the methanation reactor 301 to the second cooling device 10. In the second cooling device 10, the water vapor is cooled to water, which is collected by the water collection tank 11, and a methane mixture gas from which moisture has been separated is collected by the methane storage tank 701 in a stage subsequent to the water collection tank 11. Note that nitrogen contained in the exhaust gas (including nitrogen resulting from conversion by the three-way catalyst 8) is contained in a final product.

Note that, when consideration is given from reaction formulae in Formulae 1 to 3, 1 mole of the methane serving as the fuel of the internal combustion engine 1 is burned to generate 1 mole of the carbon dioxide and 2 moles of the water vapor (Formula 1), and the 2 moles of water vapor is electrolyzed in the electrolysis device 2 to generate 2 moles of the hydrogen (Formula 2). In other words, from the 1 mole of methane, the 1 mole of carbon dioxide and the 2 moles of hydrogen are generated. Meanwhile, to generate 1 mole of the methane in the methanation reactor 301, 1 mole of the carbon dioxide and 4 moles of the hydrogen are required (Formula 3). In short, the 1 mole of carbon dioxide contained in the exhaust gas discharged from the internal combustion engine 1 cannot entirely be methanated by the 2 moles of hydrogen generated from the 2 moles of water vapor contained in the exhaust gas similarly discharged from the internal combustion engine 1. Accordingly, it is required to newly supply 2 moles of hydrogen equivalent to a shortage or supply additional 2 moles of water vapor to the electrolysis device 2 and thereby generate the 2 moles of hydrogen equivalent to the shortage. When the additional 2 moles of water vapor is supplied to the electrolysis device 2 to generate the 2 moles of hydrogen, by supplying the 2 moles of water vapor generated in the methanation reactor 301, i.e., 2 moles of the water collected by the water collection tank 11 as the high-temperature water or water vapor to the electrolysis device 2 via the first cooling device 9, it is possible to additionally generate 2 moles of the hydrogen in the electrolysis device 2. The additional 2 moles of hydrogen thus generated can be used as the 2 moles of hydrogen equivalent to the shortage in the methanation reactor 301.

In the configuration of the third embodiment, the hydrogen generated in the electrolysis device 2 and the carbon dioxide contained in the exhaust gas are supplied at the high temperature to the methanation reactor 301 connected in series to the electrolysis device 2. Therefore, the hydrogen and carbon dioxide need not be heated for the methanation, and can be converted to easy-to-store methane.

Figure 7:
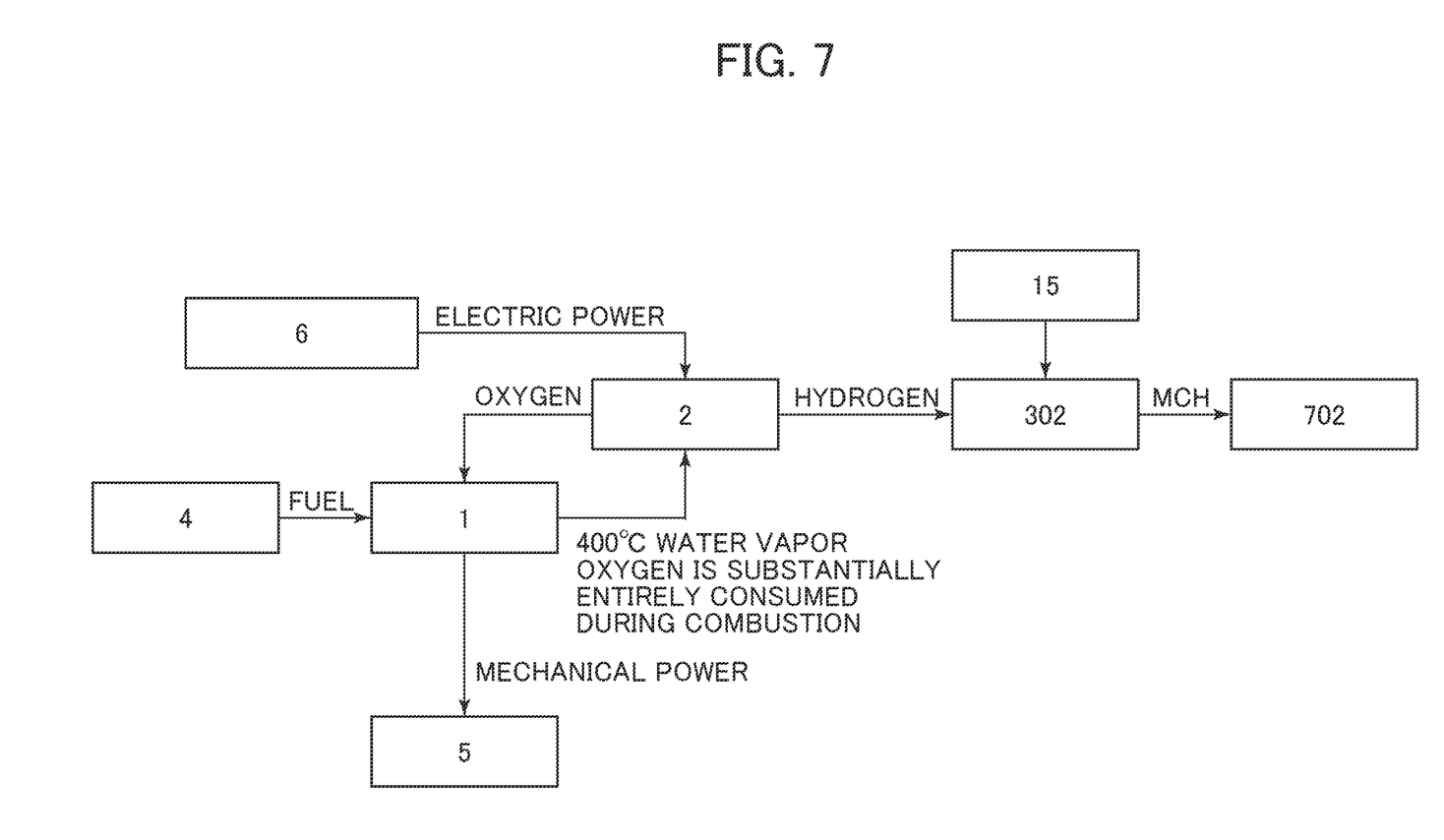
FIG. 7 is a diagram illustrating a configuration of a fourth embodiment of the fuel production device of the present invention.

FIG. 7 illustrates a configuration of a fourth embodiment in which, in the fuel production device of the present invention, the organic hydride reactor 302 is used as the hydrogenation reactor, and toluene and methylcyclohexane are each used as the organic hydride. The configuration of the fourth embodiment includes the internal combustion engine 1, the electrolysis device 2 connected to the internal combustion engine 1 of concern, and the organic hydride reactor 302 connected to the electrolysis device 2 of concern. To the internal combustion engine 1, the fuel tank 4 for supplying the fuel to the internal combustion engine 1 and the power generator 5 operated by the mechanical power from the internal combustion engine 1 are further connected, and the connection between the internal combustion engine 1 and the electrolysis device 2 includes piping for supplying the exhaust gas from the internal combustion engine 1 to the electrolysis device 2 and piping for supplying the oxygen generated from the electrolysis device 2 to the internal combustion engine 1. To the electrolysis device 2, the renewable energy source 6 for supplying the electric power to the electrolysis device 2 is further connected. To the organic hydride reactor 302, a methylcyclohexane storage tank 702 for storing liquid methylcyclohexane generated in the organic hydride reactor 302 and a toluene storage tank 15 for storing toluene as a dehydrogenated material are further connected. Note that, between the electrolysis device 2 and the organic hydride reactor 302, a cooling device for adjustment to a temperature appropriate as a hydrogenation reaction starting temperature, e.g., a heat exchanger may also be disposed. The internal combustion engine 1 and the organic hydride reactor 302 may also be connected with a cooling water line.

In the configuration of the fourth embodiment, first, the fuel supplied from the fuel tank 4 to the internal combustion engine 1 is burned to generate 400° C. water vapor and a mechanical power, and the 400° C. water vapor is supplied to the electrolysis device 2, while the mechanical power is transmitted to the power generator 5. At this time, by adjusting the ratio between the fuel and oxygen to be supplied to the internal combustion engine 1 so as to effect the stoichiometric combustion, the oxygen is substantially entirely consumed during the combustion and prevented from being contained in the exhaust gas. Subsequently, the 400° C. water vapor supplied to the electrolysis device 2 operated by the renewable energy source 6 is decomposed by the high temperature electrolysis into oxygen and hydrogen, and the oxygen is supplied to the internal combustion engine 1, while the hydrogen is supplied to the organic hydride reactor 302. The hydrogen supplied to the organic hydride reactor 302 reacts with the toluene supplied from the toluene storage tank 15 to be converted to the liquid methylcyclohexane, which is stored in the methylcyclohexane storage tank 702. Note that a temperature (outlet-side temperature) of the methylcyclohexane discharged from the organic hydride reactor 302 is preferably set to 85° C. to 98° C. by the cooling device and/or cooling water line disposed in a stage previous to the organic hydride reactor 302.

In the configuration of the fourth embodiment, the hydrogen generated in the electrolysis device 2 is supplied at a high temperature to the organic hydride reactor 302 connected in series to the electrolysis device 2. Therefore, the hydrogen need not be heated for the hydrogenation reaction, and can be converted to the easy-to-store liquid methylcyclohexane.

Figure 8:
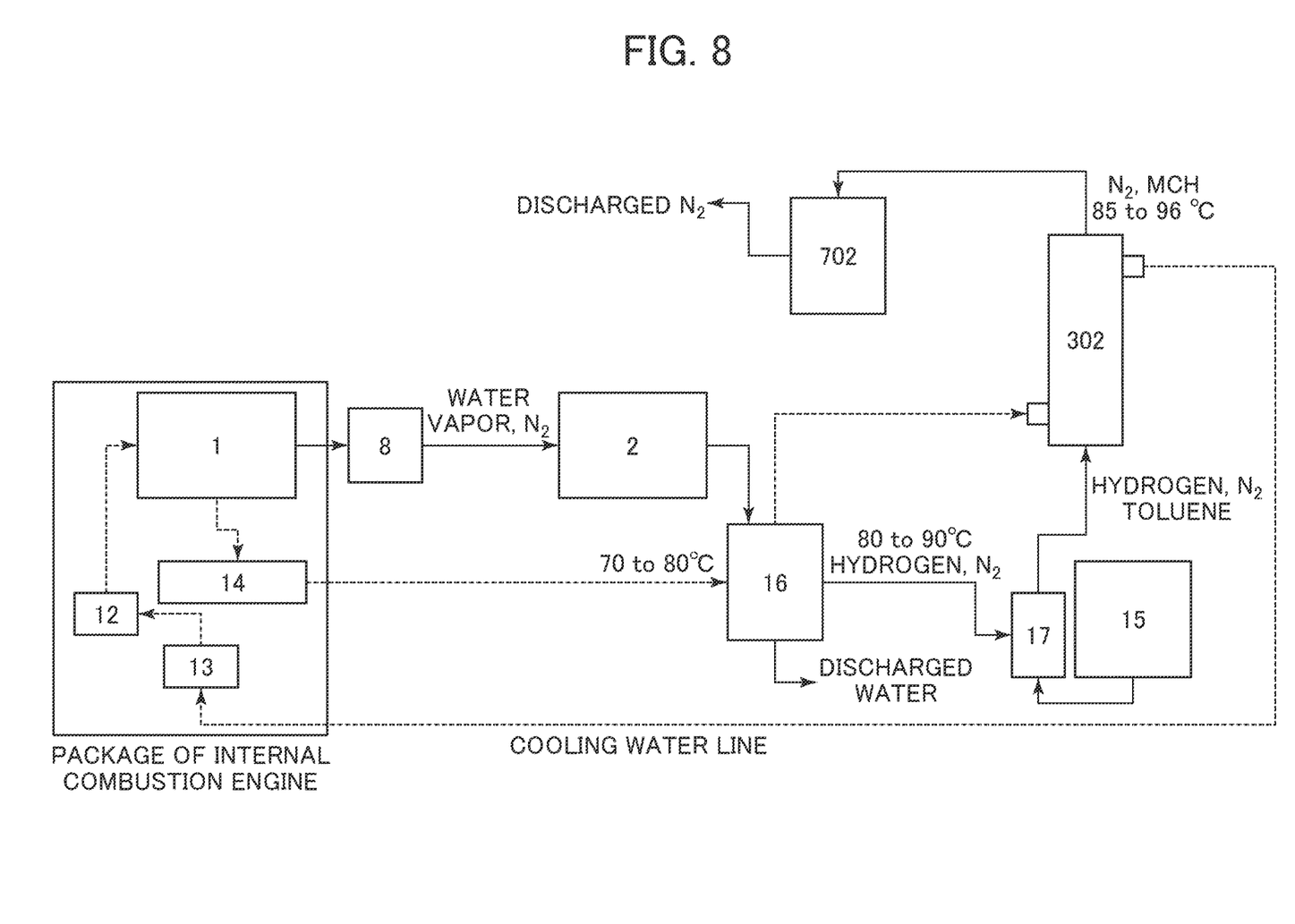
FIG. 8 is a diagram illustrating a configuration of a fifth embodiment of the fuel production device of the present invention.

FIG. 8 illustrates a configuration of a fifth embodiment into which the fourth embodiment is further embodied. The configuration of the fifth embodiment includes, in series, the internal combustion engine 1, the three-way catalyst 8 connected to the internal combustion engine 1 of concern to remove toxic substances, the electrolysis device 2 connected to the three-way catalyst 8 of concern, the cooling device 16 for adjustment to a temperature appropriate for the hydrogenation reaction which is connected to the electrolysis device 2 of concern, a toluene vaporizer 17 connected to the cooling device 16 of concern, and the organic hydride reactor 302 connected to the toluene vaporizer 17 of concern. To the toluene vaporizer 17, the toluene storage tank 15 for storing toluene as a dehydrogenated material is further connected. To the organic hydride reactor 302, the methylcyclohexane storage tank 702 for storing the liquid methylcyclohexane generated in the organic hydride reactor 302 is further connected. The internal combustion engine 1 further includes the cooling water line (including the cooling water pump 12, the cooling water tank 13, and the radiator 14) connecting the internal combustion engine 1, the cooling device 16, and the organic hydride reactor 302.

In the configuration of the fifth embodiment, first, the fuel supplied from the fuel tank to the internal combustion engine 1 is burned to generate high-temperature water vapor, and the high-temperature water vapor of concern is subjected to removal of the toxic substances (such as the unburned hydrocarbon, the carbon monoxide, and the nitric oxide) therefrom in the three-way catalyst 8, and then supplied to the electrolysis device 2. At this time, by adjusting the ratio between the fuel and oxygen to be supplied to the internal combustion engine 1 so as to effect the stoichiometric combustion, the oxygen is prevented from being contained in the exhaust gas. Subsequently, the high-temperature water vapor supplied to the electrolysis device 2 is decomposed by the high-temperature electrolysis into oxygen and hydrogen, and the hydrogen is adjusted to 80° C. to 90° C. as a temperature appropriate as a temperature at which a hydrogenation reaction to the toluene is started in the cooling device 16 and then supplied to the toluene vaporizer 17. Note that water generated by cooling is removed in the cooling device 16 or in a water separation tank (not shown) connected to the cooling device 16. The hydrogen and nitrogen gas supplied to the toluene vaporizer 17 vaporize an amount of the toluene equivalent to a vapor pressure in the toluene vaporizer 17 of concern to be supplied together with toluene vapor to the organic hydride reactor 302. The hydrogen and toluene vapor supplied to the organic hydride reactor 302 are converted at an appropriate reaction temperature of 85° C. to 96° C. resulting from adjustment by the cooling water line to methylcyclohexane. The methylcyclohexane resulting from the conversion is supplied at a temperature of 85° C. to 96° C. from the organic hydride reactor 302 to the methylcyclohexane storage tank 702. Note that the nitrogen contained in the exhaust gas (including the nitrogen resulting from the conversion by the three-way catalyst) is finally discharged from the methylcyclohexane storage tank 702.

In the configuration of the fifth embodiment, the hydrogen generated in the electrolysis device 2 is supplied at the high temperature to the organic hydride reactor 302 connected in series to the electrolysis device 2. Therefore, the hydrogen need not be heated for the hydrogenation reaction, and can be converted to the easy-to-store liquid methylcyclohexane.

Figure 9:
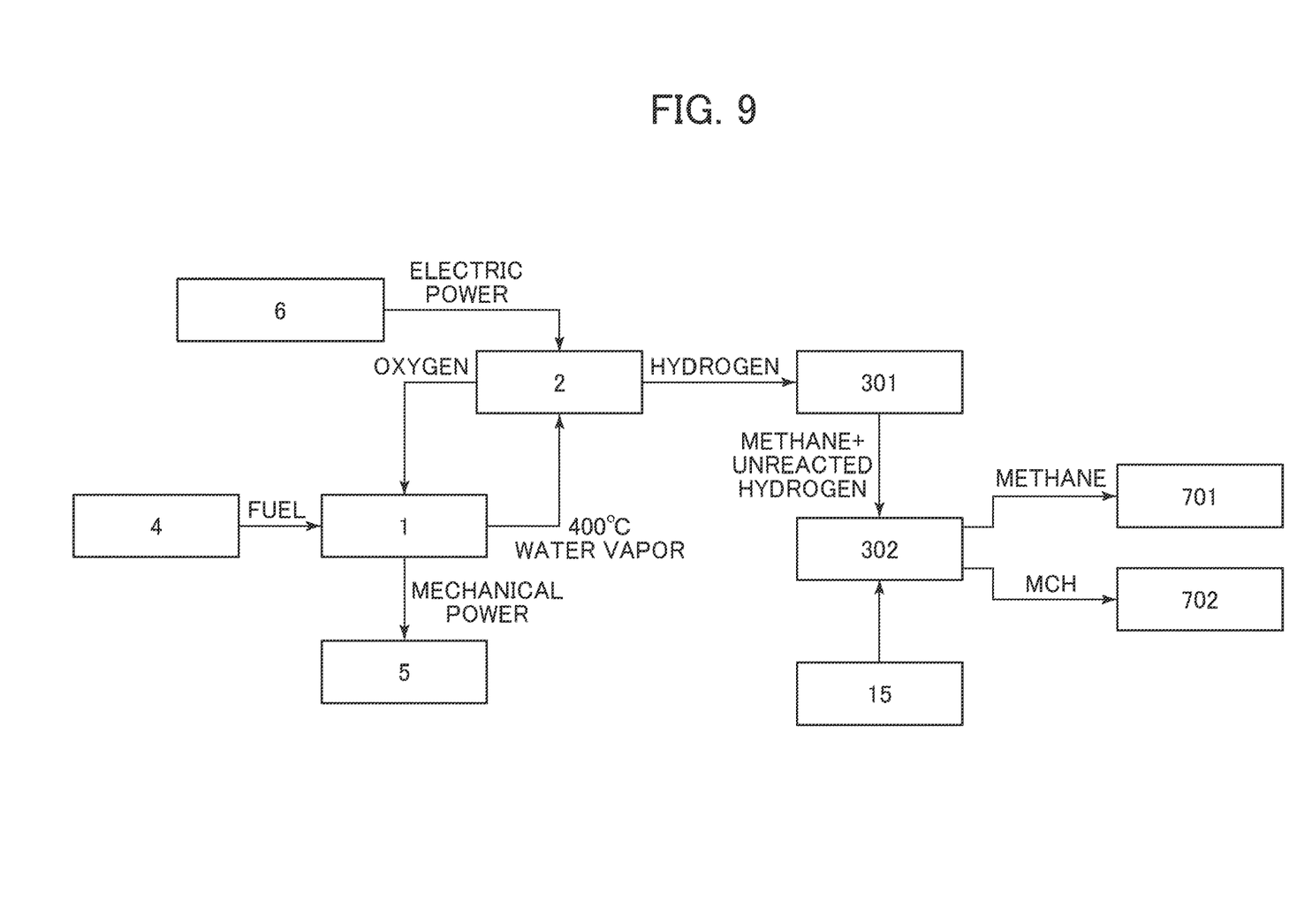
FIG. 9 is a diagram illustrating a configuration of a sixth embodiment of the fuel production device of the present invention.

FIG. 9 illustrates a configuration of a sixth embodiment in which, in the fuel production device of the present invention, each of the methanation reactor 301 and the organic hydride reactor 302 is used as the hydrogenation reactor. The configuration of the sixth embodiment includes the internal combustion engine 1, the electrolysis device 2 connected to the internal combustion engine of concern, the methanation rector 301 connected to the electrolysis device 2 of concern, and the organic hydride reactor 302 connected to the methanation reactor 302 of concern. To the internal combustion engine 1, the fuel tank 4 for supplying the fuel to the internal combustion engine 1 and the power generator 5 operated by the mechanical power from the internal combustion engine 1 are further connected, and the connection between the internal combustion engine 1 and the electrolysis device 2 includes piping for supplying the exhaust gas from the internal combustion engine 1 to the electrolysis device 2 and piping for supplying the oxygen generated from the electrolysis device 2 to the internal combustion engine 1. To the electrolysis device 2, the renewable energy source 6 for supplying the electric power to the electrolysis device 2 is further connected. To the methanation reactor 301, the methane storage tank 701 for storing the methane generated in the methanation reactor 301 and the organic hydride reactor 302 for further reacting unreacted hydrogen in the methanation rector 301 are further connected. To the organic hydride reactor 302, the methylcyclohexane storage tank 702 for storing the liquid methylcyclohexane generated in the organic hydride reactor 302 and the toluene storage tank 15 for storing toluene as a dehydrogenated material are further connected. Note that, between the electrolysis device 2 and the methanation reactor 301 and between the methanation reactor 301 and the organic hydride reactor 302, cooling devices for adjustment to a temperature appropriate as a methanation reaction and/or hydrogenation reaction starting temperature, e.g., heat exchangers may also be disposed. The internal combustion engine 1, the methanation reactor 301, and the organic hydride reactor 302 may also be connected by a cooling water line.

In the configuration of the sixth embodiment, first, the fuel supplied from the fuel tank 4 to the internal combustion engine 1 is burned to generate 400° C. water vapor, carbon dioxide, and a mechanical power, and the 400° C. water vapor and the carbon dioxide are supplied to the electrolysis device 2, while the mechanical power is transmitted to the power generator 5. At this time, by adjusting the ratio between the fuel and oxygen to be supplied to the internal combustion engine 1 so as to effect the stoichiometric combustion, the oxygen is substantially entirely consumed during the combustion and prevented from being contained in the exhaust gas. Subsequently, the 400° C. water vapor supplied to the electrolysis device 2 operated by the renewable energy source 6 is decomposed by the high temperature electrolysis into oxygen and hydrogen, and the oxygen is supplied to the internal combustion engine 1, while the hydrogen is supplied to the methanation reactor 301. Note that the carbon dioxide contained in the exhaust gas is also supplied to the methanation reactor 301 without being electrolyzed. The hydrogen and carbon dioxide supplied to the methanation reactor 301 are converted to methane, which is stored in the methane storage tank 701. Note that the gas temperature (outlet-side gas temperature) of the methane discharged from the methanation rector 301 is preferably set to 220° C. to 250° C. by the cooling device and/or the cooling water line disposed in the stage previous to the methanation reactor 301. Subsequently, unreacted hydrogen in the methanation reactor 301 is supplied to the organic hydride reactor 302, while remaining mixed with the methane as a reaction product. The hydrogen in the foregoing gas mixture supplied to the organic hydride reactor 302 reacts with the toluene supplied from the toluene storage tank 15 to be converted to the liquid methylcyclohexane, which is stored in the methylcyclohexane storage tank 702. The methane in the foregoing gas mixture has no involvement in a methylcyclohexane generation reaction, and can thus be separated by being discharged as a gas. Note that the temperature (outlet-side temperature) of the methylcyclohexane discharged from the organic hydride reactor 302 is preferably set to 85° C. to 98° C. by the cooling device and/or the cooling water line disposed in the stage previous to the organic hydride reactor 302.

In the configuration of the sixth embodiment, the hydrogen generated in the electrolysis device 2, the carbon dioxide contained in the exhaust gas, and the unreacted hydrogen in the methanation reactor 301 are supplied at the high temperature to the methanation reactor 301 connected in series to the electrolysis device 2 and to the organic hydride reactor 302 connected in series to the methanation reactor 301, and therefore the hydrogen, carbon dioxide, and unreacted hydrogen need not be heated for the methanation and hydrogenation reaction, and can be converted to the easy-to-store methane and liquid methylcyclohexane.

Note that the present invention is not limited to the embodiments described above and includes various modifications. For example, a part of a configuration of each of the embodiments may be added to another configuration, deleted, or replaced with another configuration.

All publications, patents and patent applications cited in the present description are incorporated herein by reference in their entirety.

LIST OF REFERENCE SIGNS

1 Internal combustion engine
2 Electrolysis device
300 Hydrogenation reactor
301 Methanation reactor
302 Organic hydride reactor
4 Fuel tank
5 Power generator
6 Renewable energy source
7 Storage tank
701 Methane storage tank
702 Methylcyclohexane storage tank
8 Three-way catalyst
9 First cooling device
10 Second cooling device
11 Water collection tank
12 Cooling water pump
13 Cooling water tank
14 Radiator
15 Toluene storage tank
16 Cooling device
17 Toluene vaporizer
31 Reaction cell
32 First casing
33 Reaction sheet
33a Through hole
34 Second casing
35 Metal foil
36 Porous layer
37 Catalyst

The invention claimed is:
1. A fuel production device comprising:
an internal combustion engine including a radiator;
an electrolysis device connected to the internal combustion engine;

a hydrogenation reactor connected to the electrolysis device;

a cooling device connected to the electrolysis device and having a first cooling water line connected to the radiator;

a toluene vaporizer connected to the cooling device and the hydrogenation reactor, wherein the electrolysis device is a device for decomposing high-temperature water vapor contained in an exhaust gas from the internal combustion engine into hydrogen and oxygen, wherein the cooling device adjusts a temperature of the hydrogen to 80° C. to 90° C., wherein the hydrogen is supplied from the cooling device to the toluene vaporizer, wherein the hydrogen supplied to the toluene vaporizer vaporizes toluene, which is supplied to the hydrogenation reactor, and wherein the hydrogenation reactor is an organic hydride reactor which causes a reaction between the hydrogen resulting from the decomposition and the toluene to convert the hydrogen and the toluene to a methylcyclohexane.

2. The fuel production device according to claim 1, further comprising:

piping for supplying the oxygen resulting from the decomposition to the internal combustion engine.

3. The fuel production device according to claim 1, further comprising:

a second cooling water line connecting the internal combustion engine and the hydrogenation reactor, wherein that a temperature of the methylcyclohexane discharged from the hydrogenation reactor is 85° C. to 98° C.

4. A method of producing a fuel of methylcyclohexane, the method comprising:

causing stoichiometric combustion of a fuel in an internal combustion engine to generate high-temperature water vapor and a high-temperature carbon dioxide;

decomposing the high-temperature water vapor into hydrogen and oxygen by using an electrolysis device;

cooling a temperature of the hydrogen to 80° C. to 90° C. by using a cooling device;

supplying the hydrogen from the cooling device to a toluene vaporizer;

vaporizing the toluene using the hydrogen supplied to the toluene vaporizer;

supplying the vaporized toluene to the hydrogenation reactor; and causing a reaction between the hydrogen resulting from the decomposition and the toluene to convert the hydrogen and the toluene to a methylcyclohexane.

5. The method according to claim 4, wherein a temperature of methylcyclohexane discharged from the hydrogenation reactor is 85° C. to 98° C.

\* \* \* \* \*